United States Patent

[11] 3,560,767

[72] Inventor Karl Traub
Furth, Bayern, Germany

[21] Appl. No. 808,446
[22] Filed Mar. 19, 1969
[45] Patented Feb. 2, 1971
[73] Assignee Grundig Elektro-Mechanische Versuchsanstalt INH Max Grundig
Furth, Bayern, Kurgartenstrasse, Germany
[32] Priority Mar. 23, 1968
[33] Germany
[31] P 17 66 026.3

[54] DELAY CIRCUIT ARRANGEMENT
12 Claims, 2 Drawing Figs.

[52] U.S. Cl. ........ 307/293, 307/255, 307/288, 307/290
[51] Int. Cl. ........ H03k 17/26
[50] Field of Search ........ 307/255, 288, 290, 293

[56] References Cited

UNITED STATES PATENTS 3,013,159 12/1961 De Sautels ........ 307/293X
3,287,608 11/1966 Pokrant ........ 307/290X
3,378,693 4/1968 Schmidt ........ 307/288X

*Primary Examiner*—Donald D. Forrer
*Assistant Examiner*—R. C. Woodbridge
*Attorney*—Michael S. Striker

ABSTRACT: An arrangement for delaying the application of a voltage supply for a predetermined time interval. An auxiliary voltage supply of identical polarity and with one terminal at a level exceeding the level of the terminal which is common to the supplies, is applied across a voltage divider. A first transistor is connected to a tap or junction of the voltage divider through its base. The emitter-collector path of this first transistor is connected across the voltage divider and the auxiliary power supply. A second transistor of opposite conductivity type relative to the first transistor is connected with its emitter to the terminal common to the two power supplies, as well as the emitter of the first transistor. The base of the second transistor is connected to a second voltage divider connected to the collector of the first transistor. Through a capacitor connected in parallel with a portion of the first voltage divider connected across the auxiliary power supply, an RC network is realized which delays the application of the voltage appearing at the collector of the second transistor, for a selected predetermined time interval.

PATENTED FEB 2 1971 3,560,767

INVENTOR.
KARL TRAUB
By: Michael S. Striker
Attorney

DELAY CIRCUIT ARRANGEMENT

BACKGROUND OF THE INVENTION

The present invention resides in a circuit arrangement which includes a timing network and two transistors of opposite conductivity type. The circuitry applies an operating voltage to a communication apparatus after the expiration of a predetermined time interval, from the instant that the circuit is switched on. The time interval is selectable over very wide limits.

A circuit arrangement is known in the art in which the delay is accomplished through relays in conjunction with two complementary transistors forming an amplifier. In this conventional arrangement, it is the task of the transistor to switch a relay periodically on-and-off. This arrangement also includes a timing element at the base of the first transistor, but does not have any other similarities in relation to the circuit of the present invention. The present invention is to provide a one-time delay in a switching process.

In the use of communication apparatus with semiconductors functioning as the active amplifying elements, it is possible that the operating voltage is made directly available when switched on. An example of such communicating apparatus is a superheterodyne receiver for high frequency electrical oscillations. Under such conditions, it is possible that a signal may appear at the output of the apparatus, when the rising operating voltage has not yet achieved its steady state value. Such an output signal, in such a situation, may have undesired distortions.

When the apparatus is designed with voltage dependent reactances as, for example, Varactor diodes, signals may appear at the output of the receiver from the transmitter in which the frequency corresponds precisely to the continuously varying resonance frequency of the tuning circuit.

When the apparatus is provided with pushbuttons which may be set as desired by the sender or transmitter, another transmitter can be the desired one which is held fixed when automatic frequency control is switched on.

It is the specific object of the present invention to avoid the preceding disadvantages. The object of the present invention is achieved by providing a circuit arrangement between one terminal of the operating voltage source and the communication apparatus, which serves to delay the application of the operating voltage. The circuit arrangement of the present invention includes two transistors of opposite conductivity type. The first one of these two transistors has its emitter connected to the operating voltage, by way of a relatively small resistor. The collector of this first transistor is connected by way of a resistor, to an auxiliary potential which is of the same polarity as the potential applied to the emitter, but is at a higher level. The base of this first transistor is, at the same time, connected to a tap or junction of a voltage divider connected between the two voltage terminals of the voltage sources associated with the collector and emitter of the transistor. One of the resistors of the voltage divider is connected in parallel with a capacitor. A specific feature of this solution to the problem is that the transistor becomes conducting after the expiration of a predetermined time interval established by a timing network at its base. Furthermore, a second transistor also becomes conducting due to the potential change at the collector of the first transistor. The collector of the first transistor is connected to the base of the second transistor through a resistor, and as a result the potential of the base of the second transistor drops to the level where the latter also becomes conducting. The communication apparatus is connected to the collector of the second transistor and to the emitter-collector path of this second transistor. The emitters of both transistors are connected together and lead to an emitter-resistor which serves as a DC feedback coupling, and connects the emitters to the operating voltage source.

SUMMARY OF THE INVENTION

A delay circuit arrangement in which two transistors of opposite conductivity type have their emitters coupled together and connected to a first potential terminal of a voltage source. The voltage of this source is to be transmitted after a predetermined time interval. An auxiliary voltage source with a potential terminal of the same polarity as the first potential terminal, but of greater magnitude, is applied to a voltage divider at one extreme terminal. The other terminal of the voltage divider is applied to the first terminal of the voltage source. A capacitor is connected in parallel with one of the resistors constituting the voltage divider. The base of one of the transistors is also connected to a tap of the voltage divider, whereas the emitter-collector path of this transistor is connected substantially in parallel with the voltage divider. The other transistor is connected with its base to the collector of a first transistor, by way of a second voltage divider. An emitter-resistor connects the emitters of both transistors to the voltage divider and to the first potential of the voltage source. The desired voltage appears at the collector of the second transistor after the expiration of a predetermined time interval from the instant that the source of voltage is applied.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
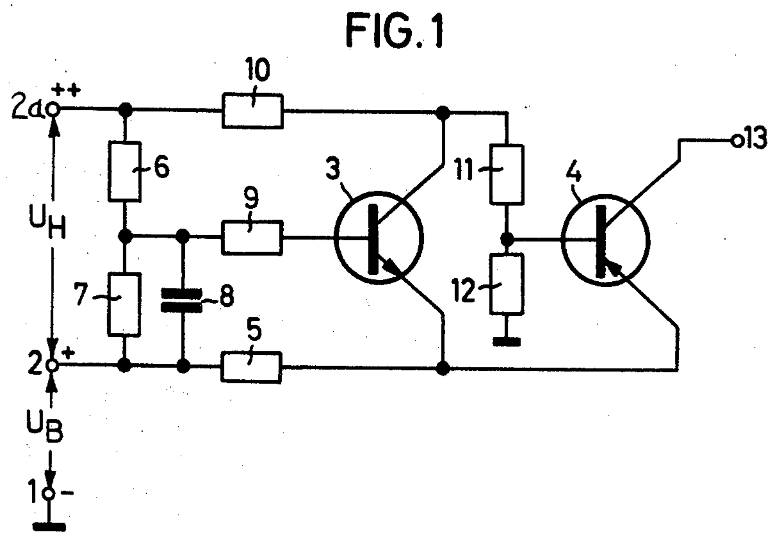
FIG. 1 is an electrical schematic diagram of the delay circuit arrangement, in accordance with the present invention, when the applied voltage source is of positive polarity.

Referring to the drawing and in particular to FIG. 1, the transistor 3 is an npn transistor, whereas the transistor 4 is of the PNP type. The emitters of these two transistors 3 and 4 are connected together, and are joined to the positive terminal 2, by way of a resistor 5 having a substantially very low resistance value. The positive voltage potential 2 is preferably from a stabilized operating voltage supply $U_B$, in which the negative supply terminal is connected to ground potential. The collector of the transistor 3 is connected to the terminal 2*a*, through the resistor 10. The terminal 2*a* is also at positive potential, but above that associated with terminal 2. The potential difference between terminals 2 and 2*a* is an auxiliary voltage source U The auxiliary voltage source $U_H$ is applied directly across a voltage divider consisting of resistors 6 and 7 connected in series. A capacitor 8 is connected in parallel with the resistor 7, by being connected to the terminal 2 and the junction between the resistor 6 and 7 of the voltage divider. This junction of the voltage divider is also a tap thereof. At the instant of time at which the two voltage sources $U_B$ and $U_H$ are simultaneously switched on, the capacitor 8 forms a short circuit for the base voltage. As a result, the transistor 3 is turned off. At the same time, the base of the transistor 4 has a potential at the high level at which the transistor 4 is also turned off. The base of the transistor 4 is connected to the junction of resistors 11 and 12 which form a voltage divider between the collector potential of the transistor 3 and ground potential. Thus, one terminal of the resistor 11 is directly connected to the collector of the transistor 3, and at the same time, to the resistor 10 leading to the voltage supply terminal 2*a*. The base of transistor 3 is connected, through resistor 9, to the junction of the voltage divider of resistors 6 and 7.

If, now, the capacitor 8 becomes charged through the resistor 6 to a potential at which the transistor becomes turned on, then the collector potential of the transistor 3 drops as a result of the voltage drop across the resistor 10 due to the collector current. The collector potential drops, in this manner, to a level which is only slightly above the emitter potential. As a result of the voltage divider of resistors 11 and 12, the base potential of the transistor 4 drops to such a level below the emitter potential, that the transistor 4 is also turned on and thereby conducts. With a transistor 4 in this turned-on or conducting state, a conducting path for the operating voltage supply is established through the output terminal 13 on the collector of the transistor 4.

Through a small amount of current through the transistor 4, a voltage drop appears across the resistor 5, and this voltage drop serves as an additional base-emitter voltage at the transistor 3. Through this voltage drop across the resistor 5, thereby, both transistors become more conducting, so that the feedback coupling, in this manner, functions spontaneously for the purpose of establishing a turning on or switching on circuit. Since the collector-emitter voltage of the transmitter 4 drops definitely to the value of the residual voltage, the stability of the delayed voltage is unaltered and identical to that of the underlaid voltage. The delay time is primarily determined by the magnitude of the auxiliary voltage source $U_H$, and through the time constants of the RC network consisting of resistor 6 and capacitor 8. As a result of the presence of the resistor 7 which is connected in parallel with the capacitor 8, dispersion or decline of the isolation characteristics of the capacitor 8, is rendered considerably ineffective. The resistor 7 also provides for the feature that the capacitor 8 becomes rapidly discharged when the circuit is switched off.

Figure 2:
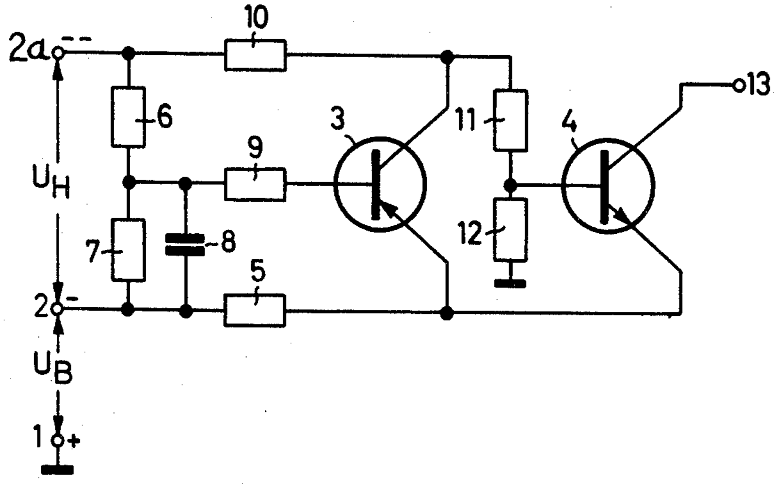
FIG. 2 is an electrical schematic diagram of the delay circuit arrangement of FIG. 1 when the applied voltage source is of negative polarity.

FIG. 2 shows an embodiment of the present invention for the case in which a voltage negative relative to the reference potential is to be switched in a delayed manner. Components or elements serving identical functions in the two FIGS. 1 and 2, are designated with identical reference numerals. In the arrangement of FIG. 2, the auxiliary voltage source $U_S$ more negative than the operating voltage supply $U_B$. At the same time, the transistors 3 and 4 are of the complementary conductivity type compared to these transistors when used in the arrangement of FIG. 1. The functional operation of the circuit of FIG. 2 corresponds to the description given above in relation to FIG. 1.

The electronic delay circuit, in accordance with the present invention, has exceptional advantages which reside in its simplicity coupled with its reliability for spontaneous transmission switching. The circuitry of the present invention is particularly suited to provide repeatability of the delay time with high accuracy and over wide selected limits. The delay voltage is uniquely referenced with respect to ground, and in given situations, the stabilization of the underlaid voltage remains fully effective.

It will be understood that each of the elements described above, or two or more together, may also find a useful application in other types of constructions differing from the types described above.

While the invention has been illustrated and described as embodied in delay circuits, it is not intended to be limited to the details shown, since various modifications and structural changes may be made without departing in any way from the spirit of the present invention.

What is claimed as new and desired to be protected by Letters Patent is set forth in the appended claims.

I claim:

1. A delay circuit arrangement comprising, in combination, a first source of voltage to be transmitted after a predetermined time interval, said first source of voltage having a reference terminal and a first potential terminal; a second source of voltage having a second potential terminal, the magnitude of the potential of said second potential terminal exceeding the magnitude of the potential of said first potential terminal, the polarity of said first terminal being identical to the polarity of said second terminal; voltage-dividing means connected between said first potential terminal and said second potential terminal; a first transistor with emitter-collector path connected in parallel with said voltage dividing means; capacitor means connected in parallel with a portion of said voltage-dividing means; a second transistor with base connected to the collector of said first transistor, said second transistor being opposite in conductivity type to said first transistor; means for connecting the collector of said first transistor to said voltage-dividing means and means for connecting the emitters of said transistors to said voltage-dividing means, whereby a desired potential appears at the collector of said second transistor a predetermined time interval after the application of said source of voltage.

2. The delay circuit arrangement as defined in claim 1 wherein said reference terminal is at ground potential.

3. The delay circuit arrangement as defined in claim 1 wherein said first potential terminal is at positive potential.

4. The delay circuit arrangement as defined in claim 1 wherein said first potential terminal is at negative potential.

5. The delay circuit arrangement as defined in claim 1 wherein said voltage-dividing means comprises two resistors connected in series.

6. The delay circuit arrangement as defined in claim 5 wherein said capacitor means is connected in parallel with one of the resistors of said voltage-dividing means.

7. The delay circuit arrangement as defined in claim 1 including means for connecting the base of said first transistor to the junction of said voltage-dividing means.

8. The delay circuit arrangement as defined in claim 1 wherein said means for connecting said emitters of said transistors to said voltage-dividing means comprises a resistor connected between said first potential terminal and said emitters.

9. The delay circuit arrangement as defined in claim 1 including second voltage-dividing means connected between the collector of said first transistor and said reference terminal, the base of said second transistor being connected to said second voltage-dividing means.

10. The delay circuit arrangement as defined in claim 9 wherein said second voltage-dividing means comprises two resistors connected in series, the junction of said two resistors of said second voltage-dividing means being connected to the base of said second transistor.

11. The delay circuit arrangement as defined in claim 7 wherein said means for connecting the base of said first transistor to said voltage-dividing means comprises a resistor.

12. The delay circuit arrangement as defined in claim 1 wherein said means for connecting the collector of said first transistor to said voltage-dividing means comprises a resistor.